H. S. SINES.
TIME SWITCH.
APPLICATION FILED JAN. 19, 1915.

1,309,426.

Patented July 8, 1919.
4 SHEETS—SHEET 1.

Witnesses:
Robert F. Bracke
Albin C. Ahlberg

Inventor
Harold S. Sines
By
Attorney

H. S. SINES.
TIME SWITCH.
APPLICATION FILED JAN. 19, 1915.

1,309,426.

Patented July 8, 1919.
4 SHEETS—SHEET 2.

Witnesses:
Robert F. Brache
Albin C. Ahlberg

Inventor
Harold S. Sines
By Hyrum A. Williams
Attorney

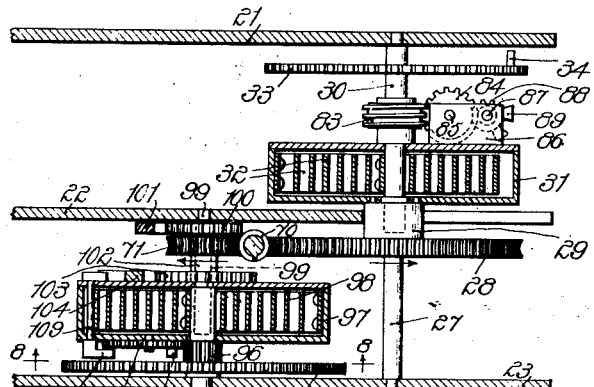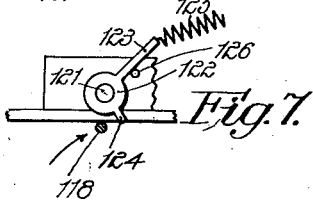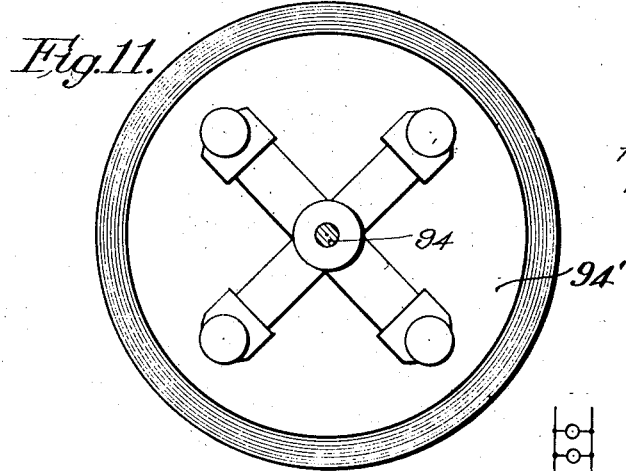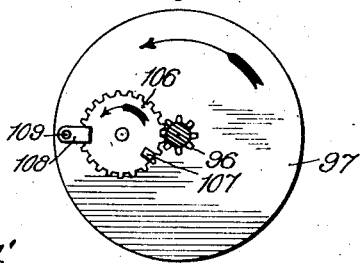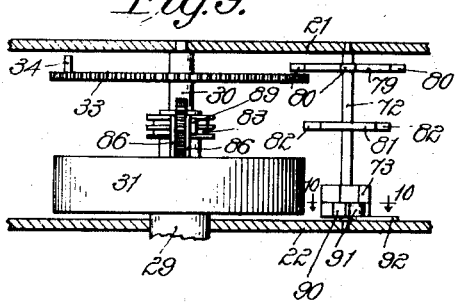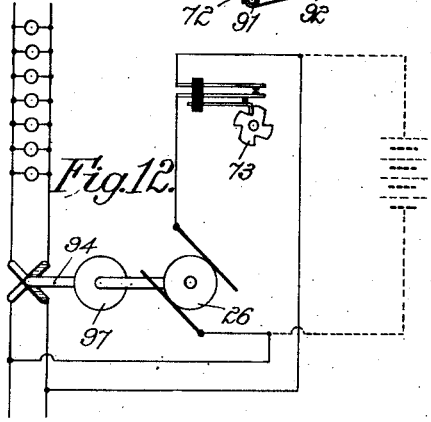

H. S. SINES.
TIME SWITCH.
APPLICATION FILED JAN. 19, 1915.

1,309,426.

Patented July 8, 1919.
4 SHEETS—SHEET 4.

Witnesses:
Albin C. Ahlberg.
Robert F. Brach.

Inventor
Harold S. Sines
By his Attorney

UNITED STATES PATENT OFFICE.

HAROLD S. SINES, OF CHICAGO, ILLINOIS, ASSIGNOR TO MINERALLAC ELECTRIC COMPANY, OF CHICAGO, ILLINOIS, A CORPORATION OF ILLINOIS.

TIME-SWITCH.

1,309,426.      Specification of Letters Patent.      Patented July 8, 1919.

Application filed January 19, 1915. Serial No. 3,021.

*To all whom it may concern:*

Be it known that I, HAROLD S. SINES, a citizen of the United States, residing at Chicago, in the county of Cook and State of Illinois, have invented a certain new and useful Improvement in Time-Switches, of which the following is a full, clear, concise, and exact description, reference being had to the accompanying drawings, forming a part of this specification.

My invention relates to time switches and the object thereof is to produce an improved mechanism of this class.

The specific embodiment of my invention hereinafter described comprises, in combination, a spring-driven time-keeping mechanism and a spring-operated switch, the two mechanisms being so related that the operation of the switch by its associated spring is controlled by the time-keeping mechanism. A single motor, preferably electrically operated, is provided to re-wind the driving springs for the time-keeping and the switching mechanisms. Mechanism controlled by the time-keeping mechanism is provided whereby the motor is periodically placed in condition to wind the driving springs for the time-keeping and switching mechanisms, the operation of the motor being stopped when the driving spring for the time-keeping mechanism has been wound a predetermined amount. The time-keeping and switching mechanisms comprise means for preventing excessive winding of the springs of either of them, and mechanism is provided whereby if, when the motor is placed in condition to wind the driving springs, the supply of the electric energy to the motor should be temporarily shut off, the clock spring will be wound to its maximum tension when the electric energy is next supplied to the motor.

This and other features of my invention are fully set forth in the following description and are illustrated in the accompanying drawings, in which—

Fig. 4 is a fragmentary sectional view taken on the line 4, 4 of Fig. 3 and looking in the direction indicated by the arrows;

Fig. 5 is a fragmentary detailed sectional view of the escapement mechanism associated with the snap switch, this view being taken along the line 5—5 of Fig. 3;

Fig. 6 is a view similar to Fig. 5 and illustrates another position of the escapement mechanism;

Fig. 7 is a fragmentary view partly in section and partly in elevation, illustrating the devices which determine the position of the escapement mechanism illustrated in Figs. 5 and 6;

Fig. 8 is a view taken on line 8, 8 of Fig. 4, Fig. 8 illustrating the portion of the mechanism which serves to prevent excessive winding of the spring which operates the snap switch;

Fig. 9 is a fragmentary view taken on the line 9, 9 of Fig. 2 and looking in the direction indicated by the arrows, Fig. 9 illustrating in detail the switching mechanism controlling the circuit for the motor which is designed to periodically rewind the driving springs for the time-keeping and switching mechanisms;

Fig. 10 is an isolated detail view of the devices which insure positive action of the switching mechanism illustrated in Fig. 9, this view being taken along the line 10—10 of Fig. 9;

Fig. 11 is a top plan view of the snap switch which forms a part of the time switch mechanism;

Fig. 12 diagrammatically illustrates circuit arrangements which may be employed if desired.

Figure 13:
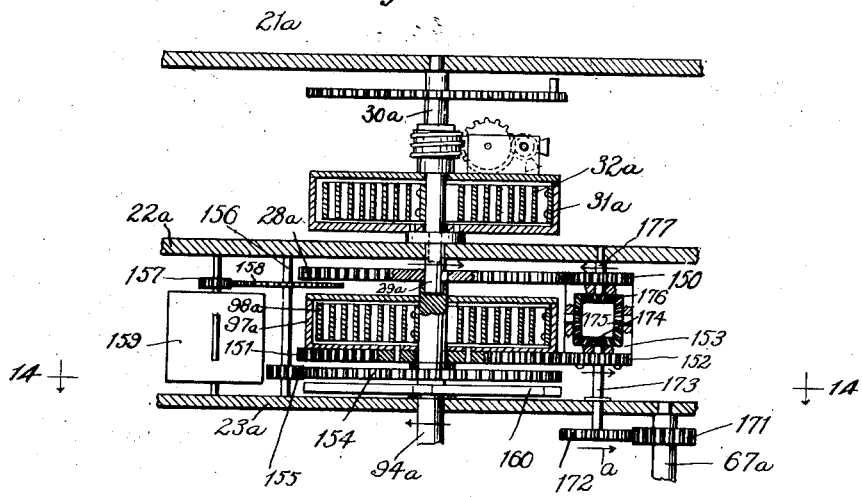
Figure 14:
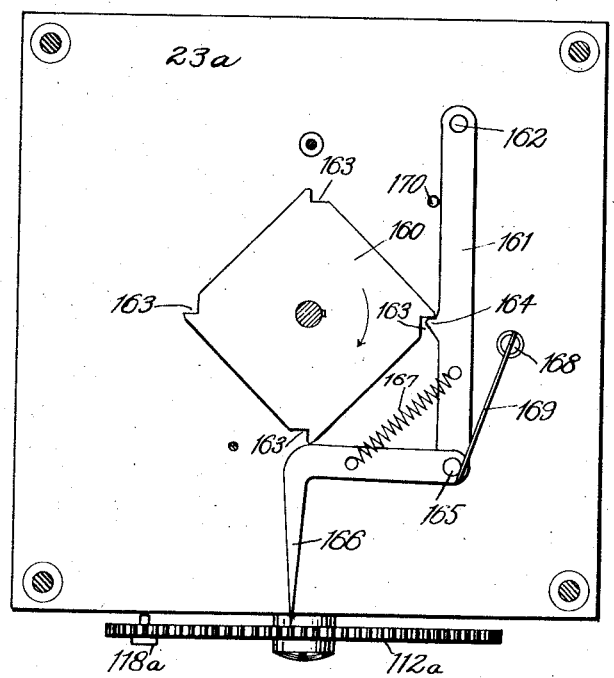

Fig. 13 is a fragmentary sectional view similar to Fig. 4, showing a modified means for winding the clock spring and auxiliary spring; and Fig. 14 is a horizontal sectional view taken along the line 14, 14 of Fig. 13 and looking in the direction indicated by the arrows.

Similar reference numerals refer to similar parts throughout the several views.

Figure 1:
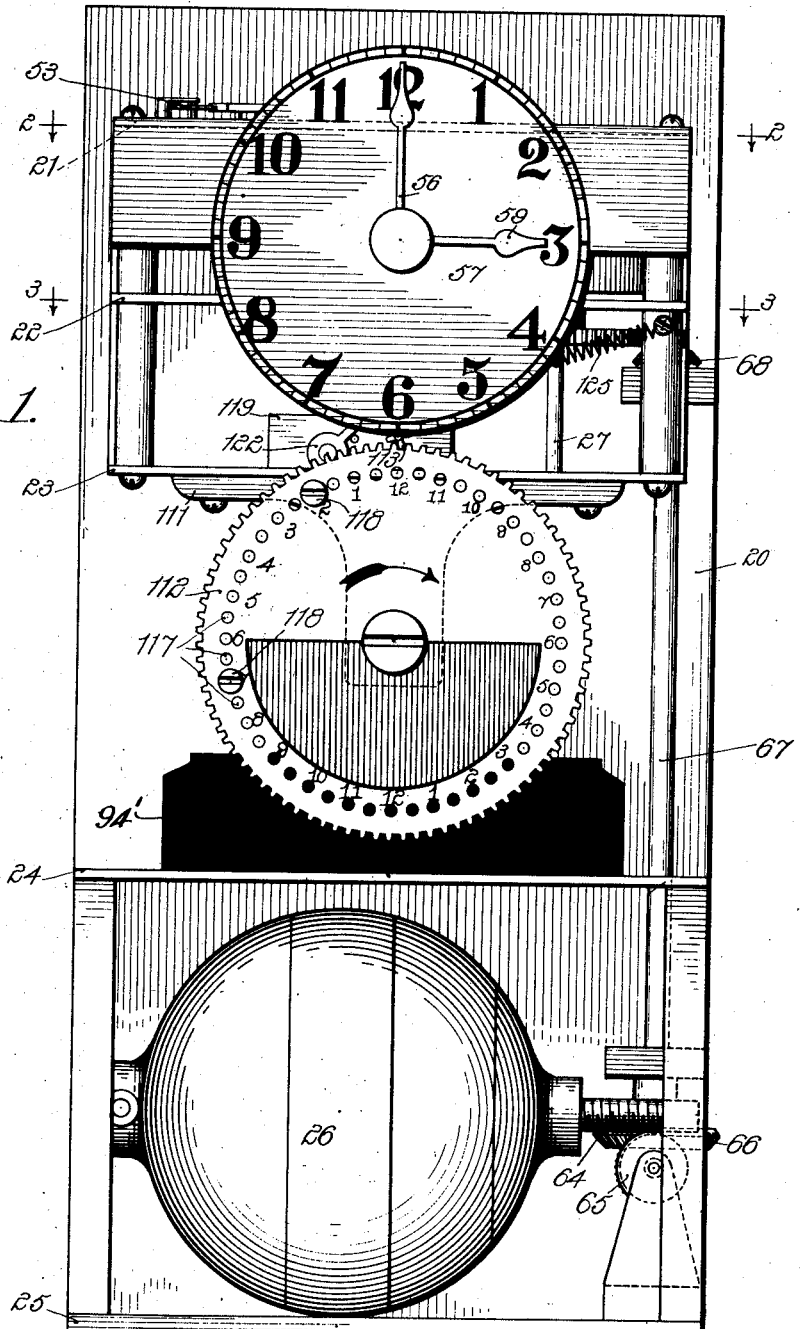
Figure 1 is a front elevational view of the mechanism of my invention.

Referring first to Fig. 1 of the drawings, it is seen that the apparatus of my invention comprises a supporting plate or base 20, and carried by the plate 20 and disposed at right angles thereto are the plates 21, 22 and 23, which are secured together and spaced apart by suitable screws and posts as illustrated, the plates 21, 22 and 23 serving to support the major portion of the time-keeping and switching mechanisms. The plate of base 20 also supports plates or shelves 24 and 25, between which is located an electric motor 26, which, as will presently be explained, operates to re-wind the springs for the time-keeping and switching mechanisms.

Bearing in the plates 22 and 23, as is perhaps most clearly illustrated in Fig. 4, is a shaft 27 having fixed thereon a comparatively large worm wheel 28. The shaft 27 is provided with an enlarged portion 29 which bears in the plate 22 and serves as a bearing for the lower end of a shaft 30, which has its upper end journaled in the plate 21, as illustrated. The shaft 30 passes freely through a drum 31, which is fixed to the enlarged portion 29 of the shaft 27 by pins or other equivalent means. Disposed within the drum 31 is a spring 32 having its outer end fixed to the inner periphery of the drum and having its inner end fixed to the shaft 30. Mounted upon the upper end of the shaft 30 is the spur gear 33 provided with a lug 34 on its upper surface, the purpose of which will presently be made apparent.

Figure 2:
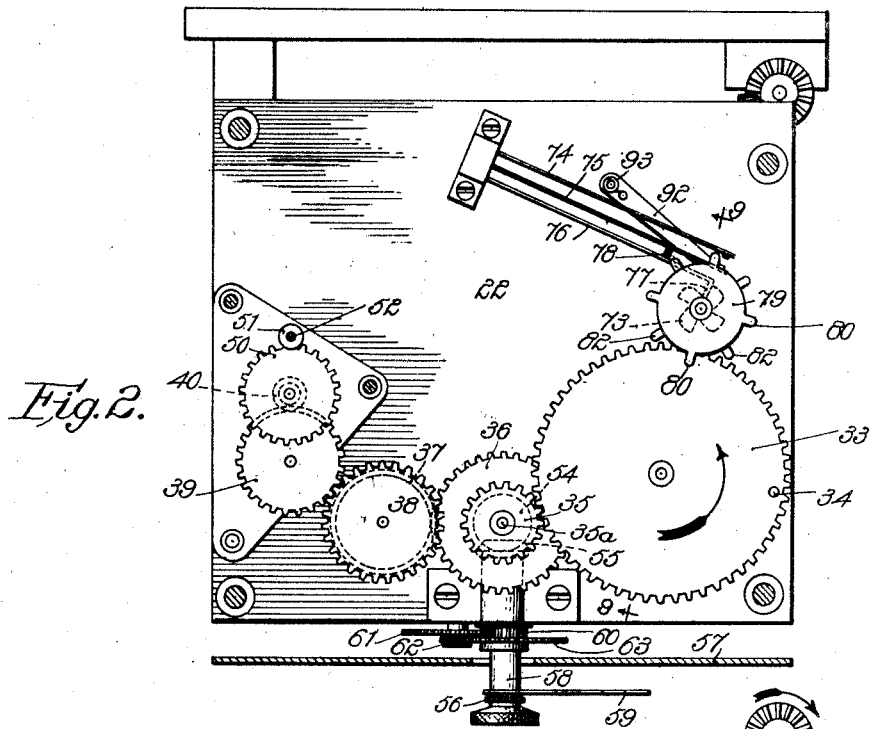
Fig. 2 is a horizontal sectional view thereof taken on the line 2, 2 of Fig. 1 and looking in the direction indicated by the arrows.

As is most clearly illustrated in Fig. 2, the spur gear 33 meshes with a pinion 35 fixed upon a shaft 35ª, and from the shaft 35ª motion is transmitted through a train comprising gears 36, 37, 38, 39, pinion 40, gear 50, and pinion 51 to a shaft 52, which shaft is in turn operatively connected with a marine escapement mechanism 53 illustrated in Fig. 1. The details of the escapement 53 are not important in so far as the present invention is concerned, and inasmuch as any desired form of escapement may be employed, the escapement mechanism in question has not been illustrated in all its details. It will suffice to say that, assuming the worm gear 28 to be stationary and the spring 32 to be under tension, the gear 33 will be rotated at a constant rate due to the clock train and escapement mechanism before mentioned.

Fixed upon the shaft 35ª, as indicated in dotted lines in Fig. 2, is a bevel gear 54, which in turn meshes with a corresponding bevel gear 55 fixed upon an arbor, which at its outer end carries a minute-hand 56, which, when the arbor is rotated, is adapted to travel over a suitable clock dial 57 in the usual manner. Disposed upon the arbor just referred to is a sleeve 58 which carries the usual hour-hand 59. Motion is transmitted from the arbor to the sleeve 58 through a suitable reducing train illustrated in Fig. 2, and comprising a pinion 60 fixed relatively to the arbor, a gear 61, pinion 62 fixed with respect to the gear 61, and gear 63 fixed with respect to the sleeve 58.

So far I have described the operating parts of the time-keeping mechanism, but have not described the means whereby the clock spring 32 may be re-wound at suitable intervals. Referring to Fig. 1, it will be seen that the shaft of the motor 26 is provided with a suitable worm 64 meshing with a worm gear 65, which has fixed with respect thereto a bevel gear meshing with a bevel gear 66 fixed upon the lower end of a shaft 67 vertically disposed in suitable bearings and provided at its upper end with a bevel gear 68. Mounted in suitable bearings carried by the plates 22 and 23 and located between said plates is a shaft 69 provided with a bevel gear 70' meshing with the bevel gear 68 carried by the shaft 67. The shaft 69 is provided with a worm 70 which, as is most clearly illustrated in Fig. 3 and 4, meshes with the worm wheel 28. The worm 70 also meshes with a worm wheel 71, which is operatively connected with the driving spring for the snap switch mechanism, which mechanism will presently be more fully described.

Figure 3:
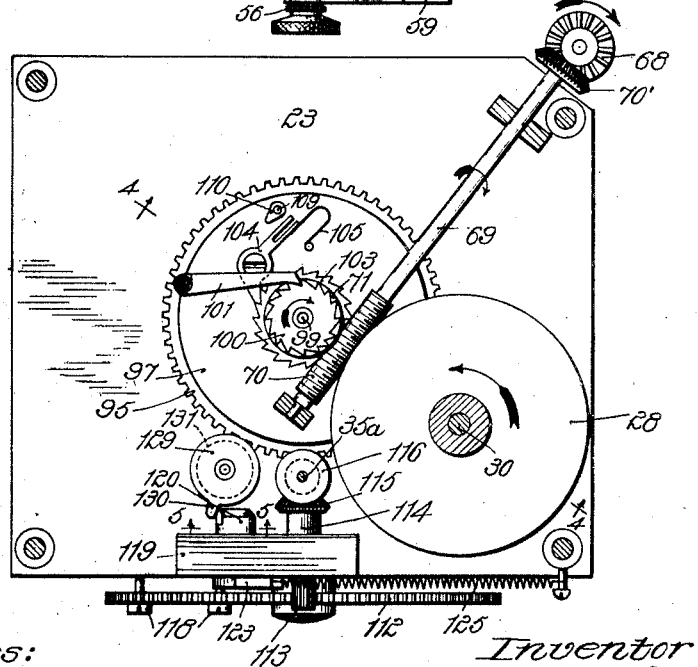
Fig. 3 is a horizontal sectional view taken on the line 3, 3 of Fig. 1 and looking in the direction indicated by the arrows.

From the foregoing description it will be seen that when the motor is operated to drive the shaft 67 in the direction indicated by the arrows in Fig. 3, the worm wheel 28 and the drum 31 will be operated to wind the spring 32. The circuit for the motor 26 is controlled by suitable switching mechanism illustrated most clearly in Figs. 2 and 9. Mounted in the plates 21 and 22 is a shaft 72 having fixed thereon a four-toothed cam 73 which forms a part of the switching mechanism controlling the circuit for the motor 26. Carried by the plate 22 is a pair of switch springs 74 and 75, which switch springs are provided with coöperating contact points as illustrated. Disposed adjacent the switch spring 75 is a third spring 76, which is provided with an offset free end 77 coöperating with the cam 73, and carried by the switch spring 75 and interposed between the springs 75 and 76 is a block of insulation 78, which separates the said springs 75 and 76. It will be seen that when the offset portion 77 of the spring 76 is in the space between a pair of the teeth of the cam 73, as illustrated in Fig. 2, the switch springs 74 and 75 will be in open position, but that when the cam 77 is operated to cause the portion of the spring 76 to ride upon one of the teeth of the cam, the switch springs will be moved to closed position.

Fixed upon the shaft 72 and disposed adjacent the spur gear 33 is a disk 79 provided with four peripheral teeth 80. The disk 79 is so disposed that normally when the gear 33 is rotated the lug 34 carried thereby will engage one of the teeth 80 of the disk 79 and advance the shaft 72 to bring the cam 73 in position to close the switch springs 74 and 75. Due to the fact that the spur gear 33 forms a part of the clock train driven by the spring 32, it will be seen that each time the gear 33 is turned through one revolution, the shaft 72 will be advanced one step, provided the disk 79 is in such an angular position that one of its teeth may be engaged by the lug 34. The length of time required to turn the gear 33 through one revolution is not material, but the several parts of the clock mechanism should be so related that the gear 33 will be turned through one revolution before the spring 32 has run down any considerable amount.

Fixed upon the shaft 72 and disposed below the disk 79 is a second disk 81 provided with peripheral teeth 82. The peripheral teeth 82 of the disk 81 are angularly displaced with respect to the teeth 80 of the disk 79, as is most clearly illustrated in Fig. 2. It will be seen, therefore, that if the several parts are in the positions illustrated in Fig. 1, if the disk is advanced one step, the cam 73 will operate to close the switch springs 74 and 75 and thereby close the circuit for the motor 26. If the disk 81 is then advanced one step, the cam 73 will be operated to permit the switch springs 74 and 75 to move to open position.

As I have before pointed out, the lug 34, carried by the spur gear 33, is arranged to advance the disk 79 one step for each revolution of the spur gear 33, provided the teeth of the disk 79 are in the proper angular positions. I shall now describe the mechanism for advancing the disk 81. As is most clearly illustrated in Figs. 4 and 9, the shaft 30 has fixed thereto a worm 83 coöperating with a gear 84 mounted upon a shaft 85 bearing in plates or brackets 86, 86 supported by the drum 31. Also mounted in the plates or brackets 86 is a shaft 87 having fixed thereon a pinion 88 meshing with the gear 84, and fixed upon one end of the shaft 88 is an arm 89, which, when the spring 32 is in fully wound condition, assumes the position illustrated in full lines in Fig. 4. From the foregoing description it will be seen that when the shaft 30 is operated by the spring 32 the shaft 88 and arm 89 will be rotated in a clockwise direction (Fig. 4). It will be understood that at all times except when the spring 32 is being re-wound the drum 31 will be stationary and therefore the amount of displacement of the arm 89 which occurs due to the coöperation between the worm 83 and gear 84 will be directly proportional to the energy lost by the spring 32 in driving the shaft 30 and parts connected therewith.

Assuming the several parts previously described to be in the positions illustrated in the drawings, when the spur gear 33 has been turned to bring the lug 34 into engagement with one of the teeth of the disk 79, the cam wheel associated with the switch springs 74 and 75 will be operated to close the switch springs and thus close the circuit for the motor 26. If there is sufficient current in the motor circuit to cause the operation of the motor, the motor will operate through the shaft 67, shaft 69 and worm 70 to drive the worm wheel 28 in the direction indicated by the arrow in Fig. 4. When this takes place the drum 31 is rotated in the same direction, inasmuch as it is fixed with respect to the worm wheel 28. When this takes place the spring 32 is re-wound. When the drum 31 is turned as aforesaid, the plates or brackets 86, 86 and the gears supported thereby are turned around the worm 83 and consequently the arm 89 is turned in a counter clockwise direction. As soon as the drum 31 has been turned an amount sufficient to restore in the spring 32 the energy previously expended, the arm 89 will have assumed its original position indicated in full lines in Fig. 4. After the arm 89 has been moved to its horizontal position and is moved past the disk 81, the arm will engage one of the teeth of the disk and advance the shaft 72 and cam 73 to permit the switch springs 74 and 75 to open. All of the parts having been returned to normal position, the operation just described is repeated. I find that sometimes the circuit for the motor 26 is temporarily out of commission when the switch springs are moved to closed position. Re-winding of the spring 32, therefore, does not occur immediately. The spring 32, however, continues to drive the clock train and rotate the arm 89 in a clockwise direction. When the motor circuit becomes operative, the motor starts to operate and continues to wind the spring 32 until the arm 89 has been returned to normal position. After the arm 89 has assumed its normal horizontal position, the disk 81 is advanced one step and the cam 73 operates the switch springs 74 and 75 to open the motor circuit as previously described.

Inasmuch as the advancement of the disks 79 and 81 sometimes occurs quite slowly, I find it desirable to provide some means to cause quick opening and closing of the switch springs 74 and 75 in order to avoid sparking at the contact point. Therefore I provide the shaft 72 with a star wheel 90 most clearly illustrated in Fig. 10. The star wheel 90 is provided with eight teeth and coöperating with the star wheel is a roller 91 mounted upon the free end of a lever arm 92 pivoted to the plate 22. Associated with the arm 92 is a spring 93, which normally tends to force the roller 91 into engagement with the star wheel 90. It will be seen that the shaft 72 may be slowly advanced until the roller 91 has passed over the end of one of the teeth of the star wheel. The spring 93 then forces the roller 91 down between a pair of the teeth of the star wheel and quickly advances the shaft 72 through the remainder of its one step advancement to effect the opening or closing of the switch springs 74 and 75 as the case may be.

I have now described the novel features of the time-keeping mechanism and have explained how the driving spring for the time-keeping mechanism is kept in wound condition. I have not, however, explained the details of the time switch mechanism and explained the coöperation between the time switch and the time-keeping mechanism. I shall now explain the details of the time switch and explain how it coöperates with the time-keeping mechanism previously described.

As is most clearly shown in Fig. 4, a shaft 94 bears in the plate 23 and has its lower end operatively connected with a four-pin snap switch 94′ illustrated in Figs. 1 and 11. Inasmuch as the snap switch may be of any one of the many types now on the market, I have not thought it necessary to illustrate the snap switch in all its details. The shaft 94 has also fixed thereto a gear 95 and a pinion 96, both of which are illustrated in Fig. 4. Disposed around the shaft 94 is a drum 97, within which is disposed a coiled spring 98, the inner end of which is fixed to the upper end of the shaft 94 and the outer end of which is attached to the inner periphery of the drum. The upper end of the shaft 94 forms a lower bearing for a shaft 99, the upper end of which bears in the plate 22. As is clearly illustrated in Fig. 4, it will be seen that the drum 97 is keyed or otherwise fixed with respect to the shaft 99. At its upper end the shaft 99 is provided with a ratchet wheel 100 and a holding pawl 101. Disposed around the shaft 99 is a sleeve 102, to the upper end of which is fixed the worm wheel 71 previously referred to, and which meshes with the worm 70 of the shaft 69. To the lower end of the sleeve 102 is fixed a ratchet wheel 103, which ratchet wheel is normally engaged by a pawl 104 pivoted to the top of the drum 97. A spring 105 tends to hold the pawl 104 in engagement with the teeth of the ratchet wheel 103.

Pivotally carried by the bottom of the drum 97 is a gear 106 which meshes with the pinion 96 previously referred to. The gear 106 is provided with a downwardly projecting lug 107 arranged, when the gear 106 is rotated, to engage a crank arm 108 fixed upon the lower end of a shaft 109, which passes vertically through the drum 97 near the periphery thereof, as is most clearly illustrated in Fig. 4. Attached to the upper end of the shaft 109 is a cam 110 arranged when operated to move the pawl 104 from engagement with its associated ratchet wheel 103. Attention is directed to the fact that the arm of the pawl 104 engaged by the spring 105 and adapted to be engaged by the cam 110 is bifurcated. The pawl 104 is preferably constructed of resilient metal, and consequently when the cam 110 is operated to move the pawl from engagement with the teeth of the ratchet wheel 103, energy stored in the pawl 104, due to the bifurcated construction serves to snap the pawl suddenly out of engagement with the teeth of the ratchet wheel 103 and thus prevents mutilation of the teeth of the ratchet wheel.

Mounted upon the bracket 111, as most clearly illustrated in Fig. 1, is a disk 112 provided with peripheral teeth meshing with a pinion 113. The pinion 113 just referred to is fixed upon a shaft 114, upon which is also fixed a bevel gear 115 meshing with a bevel gear 116 fixed upon the shaft 35ª of the clock train previously described. It will be understood, therefore, that the disk 112 is driven at a constant rate. Formed in the disk 112 near the periphery thereof is a plurality of apertures 117 which may be numbered as indicated, if desired. The apertures 117 are arranged to receive pins 118, 118, which, as will presently be described, serve to control in part the operation of the snap switch mechanism. The apertures 117 are preferably numbered as indicated in Fig. 1 of the drawings, and the disk 112 is preferably colored on one side as indicated by the shade lines in Fig. 1, to distinguish those apertures corresponding to the hours of the night and those apertures corresponding to the hours of the day.

The plate 23 supports a block 119 which serves as a bearing for the shaft 114, which serves to communicate motion from the time-keeping mechanism to the disk 112. The block 119 also supports an escapement mechanism for the snap switch mechanism. The escapement mechanism referred to comprises a cylindrical member 120 having a shaft 121 passing through the block 119. Attached to the end of the shaft 121 opposite the cylindrical member 120 is a hub 122 provided with arms 123 and 124, as most clearly illustrated in Fig. 7. A coiled spring 125 normally tends to hold the arm 123 against a stop pin 126 carried by the block 119. The arm 124 is arranged to be engaged by the pins 118 carried by the disk 112. Formed in the end of the cylindrical escapement member 120 are intersecting grooves 127 and 128, the function of which will presently be explained.

As is most clearly illustrated in Fig. 3, a disk 129 is arranged to rotate in proximity to the cylindrical escapement member 120, and this disk 129 is provided with a peripheral lug 130. Fixed with respect to the disk 129 is a pinion 131 which meshes with the gear 95. Normally the cylindrical escapement member 120 is in the position illustrated in Fig. 5, and consequently the disk 129 is retained in the position illustrated in Figs. 3 and 5. When the arm 124 is engaged by one of the pins 118 carried by the disk 112, the cylindrical escapement member 120 is moved to the position illustrated in Fig. 6, thus permitting the lug 130 of the disk 129 to move to the position shown. It will be understood that the spring 98 normally tends to rotate the gear 95 and consequently the disk 129. The mechanism is preferably so arranged that when the disk 129 moves from the position shown in Fig. 5 to the position shown in Fig. 6, the spring associated with the snap switch mechanism is placed under tension so that after the pin 118, which has engaged and moved the arm 124, has passed the arm to permit the cylindrical escapement member 120 to return to the position shown in Fig. 5, the energy stored in the spring of the snap switch and the energy imparted by the spring 98 will quickly operate the snap switch. It will be understood that any time the motor 26 winds the driving spring for the time-keeping mechanism, the spring 98 will be wound, if it requires re-winding, due to the connection between the worm shaft 69 and the worm gear 71. It will be understood, however, that oftentimes the spring 98 has uncoiled but very little when re-winding of the spring for the time-keeping mechanism takes place, and consequently the spring 98 requires little or no re-winding. When the worm wheel 71 is operated, the sleeve 102 is also rotated and motion is transmitted from the ratchet 103 to the drum 97 through the pawl 104. When the drum 97 is rotated to wind the spring 98 as just explained, the gear 106 is rotated in the direction indicated by the arrow in Fig. 8 due to the fact that it meshes with the pinion 96. The gear ratios are such that after the spring 98 has been wound to its maximum tension, the lug 107 carried by the gear 106 engages the arm 108 and thereby disengages the pawl 104 from the ratchet 103, as has been previously explained. It will be seen, therefore, that if the spring 98 requires winding, it is wound each time that the winding of the driving spring for the time-keeping mechanism occurs and that the rewinding of the spring 98 ceases as soon as it has been wound to a predetermined tension. Although mechanism is provided to disconnect the drum 97 from the re-winding motor, the winding of the driving spring for the time-keeping mechanism goes on until this last-mentioned spring has been wound to a predetermined tension, whereupon the motor circuit is opened as has been previously explained.

It will be understood that the disk 112 may carry as many pins 118 as desired. In the drawings I have illustrated two such pins. It will be understood that any time one of the pins 118 engages the arm 124, as shown in Fig. 7, the snap switch mechanism is caused to operate to open or close the circuit controlled thereby. In Fig. 1 of the drawings, I have illustrated the pins 118 in position such that the snap switch mechanism is caused to operate to close a circuit at two o'clock in the afternoon and to open this circuit at seven o'clock in the evening. If more than two pins are used, it will be seen that alternate pins cause operation of the snap switch mechanism to close the circuit controlled thereby and that the other pins cause operation of the snap switch mechanism to open the circuit.

In Fig. 12 of the drawings the several co-operating elements have been illustrated quite diagrammatically. It will be seen that the snap switch controls the circuit for a lamp load and that the re-winding motor is operatively connected with the feeders which are arranged to be connected with the lamp load. It is not essential, however, that the re-winding motor be supplied with energy in this manner, but, on the other hand, the motor may be equipped with an independent source of current, as illustrated in dotted lines.

In the modification shown in Figs. 13 and 14, I have shown supporting plates 21$^a$, 22$^a$ and 23$^a$. Rotatably mounted between the plates 21$^a$ and 22$^a$ is the shaft 30$^a$, to which is secured the clock spring 32$^a$, which is secured at its other end to a drum 31$^a$. The drum 31$^a$ is provided with a semaphore arrangement previously described in connection with the device illustrated in Figs. 1 to 12, inclusive. The shaft 30$^a$ extends downwardly and projects into a second shaft 29$^a$, to which is keyed a gear 28$^a$ meshing with a second gear 150. The shaft 29$^a$ is loosely mounted in a third shaft 94$^a$, to which is secured the auxiliary or switch spring 98$^a$. This spring, like the one described in connection with the other device, is secured to the shaft 94$^a$ and to the drum 97$^a$. Rigidly held by the drum 97$^a$ is a gear 151 meshing with a gear 152 rigidly secured to a differential bracket 153. Carried by the shaft 94$^a$ is a gear of relatively large size 154 meshing with the pinion 155 carried by the shaft 156. Connected by means of pinions and gears 157 and 158 is a wind plate 159. Keyed to the shaft 94ª is an escapement plate 160 adapted to coöperate with the lever 161 pivoted at 162 to the plate 23ª. The escapement plate 160 is provided with four notches 163, each arranged when in position adjacent the lever 161 to coöperate with an extension 164 carried by the lever 161. Extending upwardly from the lever 161 is a post 165, to which is pivoted an arm 166. This arm as shown is arranged to extend outwardly so as to coöperate with the time-actuated gear and pins. This time-actuated gear shown at 112ª is identical with the one illustrated in Figs. 1 to 12, inclusive, and is driven from the clock mechanism. A spring 167 is interposed between the arm 166 and lever 161 to retain the parts in the position illustrated in the drawings. Carried by post 168 is a flat spring 169 arranged to abut against the post 165 to hold the lever 161 in position to lock the escapement plate 160. A pin 170 is arranged to limit the movement of the lever 161 when the escapement is caused to operate as will be presently described.

The driving shaft which is connected with a motor is shown at 67ª and carries a pinion 171 meshing with a gear 172 mounted on a shaft 173. The shaft 173 extends upwardly and is loosely mounted in a differential bracket 153 and carries a beveled gear 174 meshing with a pair of beveled gears 175 rotatably carried by the bracket 153. Both beveled gears 175 mesh with a beveled gear 176 keyed to a shaft 177, to which the gear 150 is secured.

The operation of the differential mechanism illustrated in Fig. 13 is as follows: Assuming that the spring 32ª has been unwound a sufficient amount to electrically connect the actuating motor, the shaft 67ª will be driven to rotate the shaft 173 in the direction indicated by the arrow A. Due to the connections of the various gears in the differential mechanism, the tendency of the shaft 173 will be to rotate the bracket 153, but due to the tension already on the spring 98ª, this bracket will remain stationary as well as the gear 152, which is carried by the bracket, and the gear 150 will be rotated to wind the spring 32ª through the gear 28ª. If both springs are in unwound condition when the winding motor is caused to operate, both springs will be wound simultaneously when the shaft 173 is rotated.

I will now describe the operation of the escapement mechanism shown in Fig. 14. When the adjustable pin 118ª engages the arm 166 and moves the same toward the right (Fig. 14), the lever 161 will be caused to disengage the escapement plate 160. As soon as this disengagement of the lever and plate takes place, the said plate will be rotated, due to the spring 98ª which has already been set forth as secured to the shaft 94ª. As the plate 160 rotates in the direction indicated by the arrow, the arm 166 is drawn inwardly due to the spring 167, the arm riding on the periphery of the escapement plate. This motion imparted to the arm 166 enables the end of the arm to move away from the path of the actuating pin 118ª and to return again to its normal position in the rear of the pin. As the escapement plate 160 rotates, the succeeding notch will, of course, be caught by the extension 164 to lock the shaft 94ª until again released by a second pin 118ª. The shaft 94ª extends downwardly and is connected with a switch mechanism similar to the switch described in connection with the other form of my device.

While I have illustrated my invention in the particular embodiment herein shown and described, I do not wish to be limited to this exact construction, but desire to claim all equivalent constructions coming within the terms and spirit of the appended claims.

I claim:—

1. Escapement mechanism for time switches comprising a spring-operated cam, a lever for locking said cam, an arm arranged to ride on said cam pivoted to said lever, means for holding said lever and arm in operating position, and an actuating device arranged to engage said arm to release the cam, said arm and cam coöperating so that the arm is caused to move out of the path of the actuating device when engaged by it and to return to its normal position in the rear of the actuating device.

2. Escapement mechanism for time switches comprising a spring operated cam, a lever for locking said cam, an arm arranged to ride on the cam and pivoted to the lever, an actuating device rotatable on an axis at right angles to said cam, and means carried by the actuating device, arranged to engage said arm for releasing the cam, said arm and cam coöperating so that the arm is caused to move out of the path of said means when engaged by it and to return to its normal position in the rear of said means.

3. Escapement mechanism for time switches comprising a spring operated cam, a lever for locking said cam, an arm pivoted to the lever and arranged to ride on the cam, a spring for holding the arm against said cam, a disk rotatable on an axis at right angles to said cam, and an actuating device carried by said disk and arranged to engage said arm for releasing the cam, said arm and cam coöperating to move the arm out of the path of the actuating device when engaged by it, and to return the arm to its normal position in the rear of the actuating device.

4. Escapement mechanism for time switches, comprising a square plate having a locking notch in each one of its corners, a locking lever adapted for engagement with said notches, an arm pivoted to said lever and riding on the periphery of said plate, and an actuating device arranged to move said arm and lever in a direction to release said plate, said arm and plate coöperating to move the arm out of the path of the actuating device when engaged by it, and to return the arm to its normal position in the rear of the actuating device.

In witness whereof, I hereunto subscribe my name this 12th day of September, A. D. 1914.

HAROLD S. SINES.

Witnesses:
MARY A. COOK,
H. A. NEIBURGER.